Jan. 9, 1962     E. MERKEL     3,015,855
METHOD OF AND DEVICE FOR MAKING HOLLOW BODIES
Filed May 1, 1958

Inventor:
Ewald Merkel
By:

Jan. 9, 1962  E. MERKEL  3,015,855
METHOD OF AND DEVICE FOR MAKING HOLLOW BODIES
Filed May 1, 1958  2 Sheets-Sheet 2

Inventor
Ewald Merkel
By
[signature]

3,015,855
METHOD OF AND DEVICE FOR MAKING HOLLOW BODIES
Ewald Merkel, Wolffssonweg 16, Hamburg, Germany
Filed May 1, 1958, Ser. No. 732,380
Claims priority, application Germany Feb. 1, 1958
6 Claims. (Cl. 18—55)

The present invention relates to the manufacture of hollow bodies from a granular to pulverous material, which is adapted under very high pressure to be molded into solid bodies.

The invention is primarily applicable with a starting material consisting of sintered and subsequently pulverized crushed polymers of halogen hydrocarbons such as perfluorocarbons, especially polytetrafluoroethylene.

It is an object of the present invention to provide a method of making hollow bodies of granular and pulverous material, which will excel by their uniform degree of porosity and which will be particularly suitable, although not limited thereto, for filter bodies for filtering such liquids and gases which attacked and destroyed heretofore employed filters.

It is another object of the present invention to provide a particularly simple method of making hollow bodies of uniform porosity.

These and other objects and advantages of the invention will appear more clearly from the following specification in connection with the accompanying drawings in which.

The method according to the present invention is characterized primarily by the following steps: A granular or pulverous starting material is filled into a hollow chamber between the outer wall of a pressure resistant mold and an elastic expandable body coaxially arranged within said pressure resistant mold. After the mold has been closed in a pressure tight manner, a pressure fluid under very high pressure is caused to act upon said elastic expandable body so that the latter will compress the material in said hollow chamber into a solid body. This body is subsequently subjected to a sintering process, preferably in a second corresponding mold, at a temperature of from 200 to 400° C.

The method according to the present invention produces a work piece which has a completely uniform porosity throughout its length and circumference. The apparatus for carrying out the method according to the present invention is considerably simpler than heretofore known molds and piston presses which on one hand in order to be able to produce the necessary desired compression of the material require a piston stroke of for instance 4 times the length of the complete work piece while on the other hand not assuring an overall uniform porosity. The elastic expandable body which preferably has an outer contour corresponding to the inner bore of the work piece may consist of a suitable elastic expandable material, preferably of rubber. The wall thickness of said elastic expandable body may be so selected that the sleeve will be sufficiently stiff in order to impart a smooth surface upon the work piece and thereby by itself give the work piece an overall uniform wall thickness. It is, of course, also possible to reinforce the elastic expandable body by slipping the expandable sleeve in close contact over a rigid hollow body preferably of steel and of the same shape, while the wall of said rigid hollow body is provided with passages for the pressure fluid introduced into said rigid hollow body. In this way, the pressure fluid will cause the sleeve to be lifted off the said hollow rigid body and to be pressed against the charged material so as to compress the same.

Figures 1, 2:
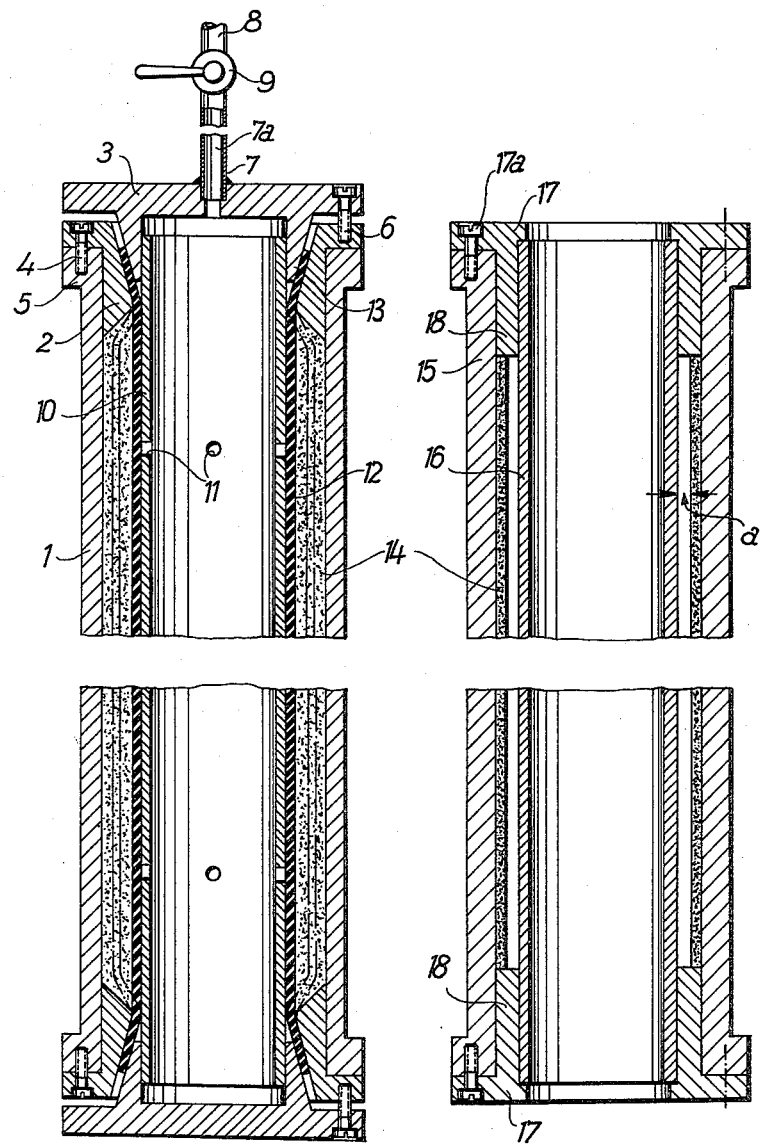
FIGS. 1 and 2 illustrate an axial section through a first embodiment of an apparatus for carrying out the method according to the present invention.

Referring now to the drawings in detail and FIGS. 1 and 2 thereof in particular, the mold shown therein represents a high pressure resistant cylindrical pressure container which comprises a cylindrical body 1 and two closures at both ends of said cylinder. Each of said closures comprises an annular flanged body 2 and a lid 3 extending over said annular flanged body. The annular bodies 2 are by means of screws 4 connected to the respective adjacent flange 5 of the cylindrical body 1. The lids or covers 3 are respectively connected to the annular bodies 2 by means of a plurality of screws 6. One of the lids 3 is provided with a connection 7 for connection with a pressure conduit 8 and a control member 9. The connection 7 has a bore 7a which leads into a pipe 10 coaxially arranged in the pressure container and extending substantially over the entire length thereof. The wall of the pipe 10 is provided with passages 11 which are substantially uniformly distributed over the length and circumference of the pipe 10. The pipe 10 which forms the core of the mold is surrounded by an elastic expandable sleeve 12. Both ends of sleeve 12 are broadened in a cone-shaped manner and are firmly and in a sealing manner clamped between the annular member 2 and a protrusion 13 of the lid 3. When no pressure prevails, sleeve 12 uniformly rests on the central pipe 10. If desired, one end of the mold may be provided with a fixed bottom in which instance, of course, the other end only would have a detachable lid construction.

The first phase of the method according to the present invention may be carried out in the following manner:

After the pressure container or vessel has been closed at its lower end, fine granular polytetrafluoroethylene is filled into the hollow chamber between the inner wall of the cylindrical body 1 and the sleeve 12 closely contacting the central pipe 10. After the said chamber has been completely filled with such fine granular polytetrafluoroethylene, the vessel or container is firmly closed by insertion of the upper annular member 2 and the lid 3. Thereupon, the control member or valve 9 is opened in order to admit a pressure fluid having a pressure up to approximately 500 atmospheres above atmospheric pressure into the central pipe 10. The pressure fluid then passes through the openings 11 and acts upon the elastic sleeve 12 so as to lift the same off the central pipe 10 while uniformly expanding the same. As indicated by dot-dash lines in FIG. 1, the sleeve 12 will then be pressed against the granular material between said sleeve and the inner wall of the cylindrical body 1 so that the said granular material will be strongly pressed against the inner wall of the body 1. In this way, due to the considerably high pressure, a solid cylindrical hollow body 14 is formed.

The second phase of the manufacture of the hollow body may be carried out by means of the mold shown in FIG. 2. This mold consists of a pressure resistant cylindrical vessel or container 15 having coaxially arranged therein a solid or hollow mandrel 16. The ends of the cylindrical vessel 15 have respectively connected thereto, for instance by screws 17a, two lids 17 provided with a cylindrical extension 18 which extends between the cylindrical vessel 15 and the mandrel 16.

The work piece or hollow body 14 produced in the mold of FIG. 1 is inserted into the vessel 15. Thereupon, the mandrel 16 is inserted into the work piece 14. Subsequently, the lids 17 are inserted into and connected to the vessel 15 as shown in FIG. 2. The next step consists in heating the work piece 14 to a temperature of approximately 200 to 400° C. The sintering process resulting therefrom imparts upon the work piece its final shape and porosity. By limiting the expansion of the work piece occurring during the sintering process, the volume and thereby, above all, the degree of porosity of the work piece can be determined by selecting corresponding measurements on one hand for the effective inner diameter of the vessel 15 with regard to the outer diameter of the work piece 14, and on the other hand for the outer diameter of the mandrel 16 with regard to the effective inner diameter of the work piece 14. The greater the expansion chamber $a$ is selected for the sintering operation, the higher will be the porosity of the work piece. If in the extreme instance the said expansion space is substantially zero, it is possible for instance to produce a completely nonporous body of sintered and also of non-sintered material. By admixing non-sintered material, the bonding and thus the mechanical resistance of the mold body can be influenced.

Figure 3:
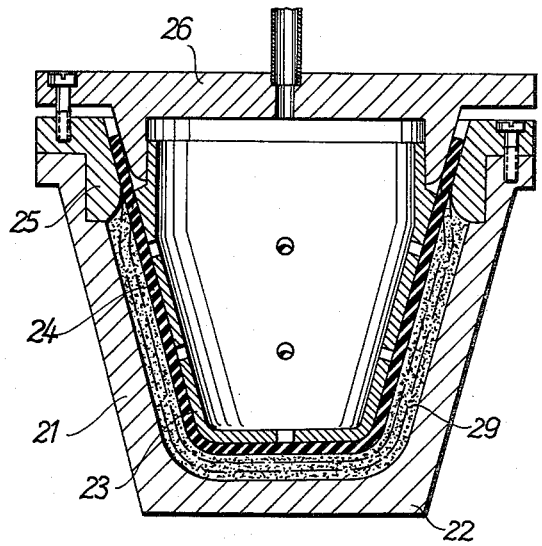
FIGS. 3 and 4 illustrate an axial section through a modified form of an apparatus for carrying out the method according to the present invention.
Figure 4:
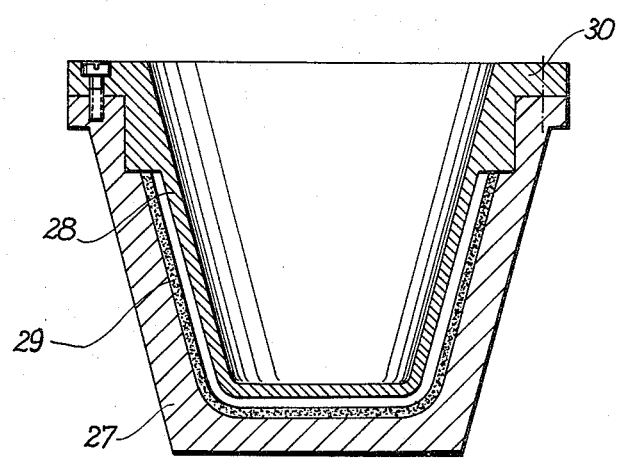

The device illustrated in FIGS. 3 and 4 for carrying out the method according to the present invention differs from that of FIGS. 1 and 2 primarily in shape, inasmuch as the molds of FIGS. 3 and 4 are intended to produce bucket-shaped work pieces with tapering wall. The steps involved in the working phases as described in connection with FIGS. 1 and 2 may also be employed in connection with the molds of FIGS. 3 and 4. As mentioned above, the differences in connection with FIGS. 3 and 4 over those of FIGS. 1 and 2 merely concern the truncated cone-shaped form of the pressure container 21 (FIG. 3), the bottom 22 of which is integral with the side walls of the member 21. Furthermore, the hollow central body 23 and the elastic sleeve 24 slipped over the body 23 are likewise of a truncated cone-shaped contour. The free ends of the sleeve 24 are firmly clamped between the flanged annular member 25 and the lid 26.

The mold illustrated in FIG. 4 comprises a container 27 and an insert 28. The container or vessel 27 and insert 28 correspond to the elements 21, 24 and 23 of FIG. 3 as far as their shape is concerned. The work piece 29 produced in the mold of FIG. 3 is subsequently placed in the mold of FIG. 4 and is subjected to a sintering process in the same way as described in connection with FIG. 2.

It will be understood that the molds according to FIGS. 1 and 2 may be, if so desired, bucket-shaped, in which instance only the upper end would be closed by a correspondingly shaped annular member 2 and lid 3.

The degree of porosity of the work piece up to a complete tightness may, if so desired, be adjusted already in the first working phase by correspondingly selecting the degree of compression. To this end, a corresponding pressure of the pressure fluid may be selected or adjusted by correspondingly adjusting the valve 9. A further means of controlling the degree of porosity of the work piece consists in correspondingly selecting the granular size of the starting material.

The second phase of the method according to the invention, namely the sintering process is, by no means, dependent on a mold. It is also possible to carry out the sintering process subsequent to the pressing operation, without the employment of a mold.

It is, of course, to be understood that the present invention is, by no means, limited to the particular construction of the mold illustrated in the drawings and the specific shape of the work piece shown in the drawings, but also comprises any modifications within the scope of the appended claims. Thus, the invention also makes it possible to produce hollow bodies of various shapes. The elastic actuating sleeve 12, 29 as well as the hollow central body 10, 23 supporting the same will be shaped accordingly. In this way, it will also be possible to produce bodies with undercut portions. Furthermore, the hollow central body 10, 23 may be subdivided in transverse or longitudinal direction particularly if undercut portions are to be produced.

It is also to be understood that the hollow bodies may be produced of sintered as well as of unsintered material or of a mixture of both materials on the basis of polyhalogen hydrocarbons.

What I claim is:

1. A method of making a hollow porous body of granular and pulverous heat expandable material composed at least partly of sintered polytetrafluoroethylene, which comprises the steps of: confining the material to be formed into said hollow body between a rigid wall of annular cross section and an elastic wall of annular cross section, subjecting said elastic wall to controlled fluid pressure so as to cause said elastic wall to expand, and compressing the material between the latter and said rigid wall, subsequently confining the compressed body in a correspondingly shaped chamber of sufficiently greater volume than the volume of said compressed body to permit limited expansion thereof, and sintering the compressed body in said chamber to expand said body to a predetermined degree of porosity.

2. A method of making a hollow porous body of granular and pulverous heat expandable material composed at least partly of sintered material adapted to be sintered, which includes the steps of: confining the material to be formed into said hollow body between a rigid wall of annular cross section and an elastic wall of annular cross section, subjecting said elastic wall to controlled fluid pressure so as to cause said elastic wall to expand, and compressing the material between the latter and said rigid wall, subsequently confining the compressed body in a correspondingly shaped chamber of sufficiently greater volume than the volume of said compressed body to permit limited expansion thereof, and sintering the compressed body in said chamber to expand said body to a predetermined degree of porosity.

3. A method of making a hollow porous body of granular and pulverous heat expandable material adapted to be sintered, which includes the steps of: confining the material to be formed into said hollow body between a rigid wall of annular cross section and an elastic wall of annular cross section while selecting the granular size of the material in conformity with the porosity desired of the body to be formed, and subjecting said elastic wall to controlled fluid pressure so as to cause said elastic wall to expand and compress the material between the latter and said rigid wall, subsequently confining the compressed body in a correspondingly shaped chamber of sufficiently greater volume than the volume of said compressed body to permit limited expansion thereof, and sintering the compressed body in said chamber to expand said body to the predetermined degree of porosity.

4. A method of making a hollow porous body of granular and pulverous heat expandable material adapted to be sintered, which includes the steps of: confining a mixture of sintered material and pulverized non-sintered material as material to be formed into said hollow body between a rigid wall of annular cross section and an elastic wall of annular cross section, and subjecting said elastic wall to controlled fluid pressure so as to cause the elastic wall to expand and compress the material between the latter and said rigid wall, subsequently confining the compressed body in a correspondingly shaped chamber of sufficiently greater volume than the volume of said compressed body to permit limited expansion thereof, and sintering the compressed body in said chamber to expand said body to a predetermined degree of porosity.

5. A method of making a hollow porous body of granular and pulverous heat expandable material adapted to be sintered, which includes the steps of: confining pulverized sintered material to be formed into said hollow body between a rigid wall of annular cross section and an elastic wall of annular cross section, and subjecting said elastic wall to controlled fluid pressure so as to cause said elastic wall to expand and compress the material between the latter and said rigid wall while selecting the magnitude of the applied pressure in conformity with the desired porosity of the body to be made, subsequently confining the compressed body in a correspondingly shaped chamber of sufficiently greater volume than the volume of said compressed body to permit limited expansion thereof, and sintering the compressed body in said chamber to expand said body to the predetermined degree of porosity.

6. A method of making a hollow body of granular and pulverous, heat expandable material adapted to be sintered which includes the steps of: confining the material to be formed into said hollow body between a rigid wall of annular cross section and an elastic wall of annular cross section, said elastic wall being sufficiently stiff to impart a smooth surface to said hollow body, subjecting said elastic wall to controlled fluid pressure so as to cause said elastic wall to expand, and compressing the material between the latter and said rigid wall, subsequently confining the compressed body in a correspondingly shaped chamber of sufficiently greater volume than the volume of said compressed body to permit limited expansion thereof, and sintering the compressed body in said chamber to expand said body to a predetermined degree of porosity.

References Cited in the file of this patent
UNITED STATES PATENTS

| | | |
|---|---|---|
| 1,226,470 | Coolidge | May 15, 1917 |
| 2,135,825 | Marguerat et al. | Nov. 8, 1938 |
| 2,400,094 | Benning et al. | May 14, 1946 |
| 2,405,245 | Ushakoff | Aug. 6, 1946 |
| 2,440,190 | Alfthan | Apr. 20, 1948 |
| 2,538,406 | Allen | Jan. 16, 1951 |
| 2,573,639 | Coler | Oct. 30, 1951 |
| 2,618,014 | Sawyer et al. | Nov. 18, 1952 |
| 2,723,426 | Pelley | Nov. 15, 1955 |
| 2,781,552 | Gray | Feb. 19, 1957 |
| 2,826,784 | Pratt | Mar. 18, 1958 |
| 2,939,178 | Haroldson et al. | June 7, 1960 |